July 6, 1948. A. FISHER 2,444,769
REGULATING SYSTEM FOR INVERTED ROTARY CONVERTERS
Filed Aug. 17, 1946
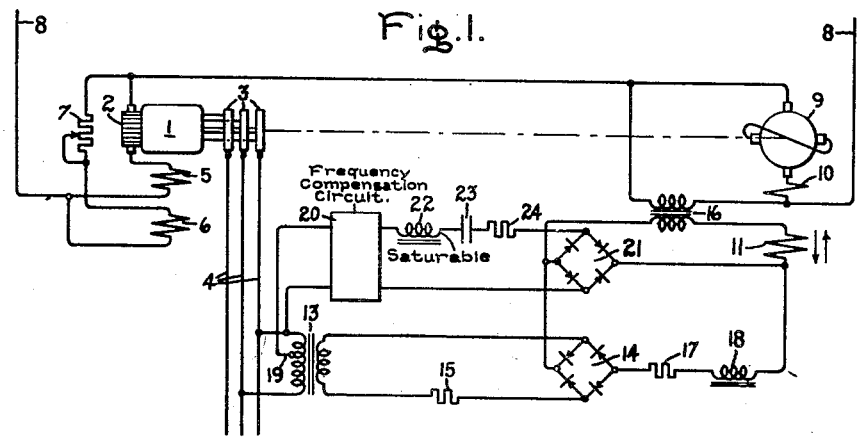
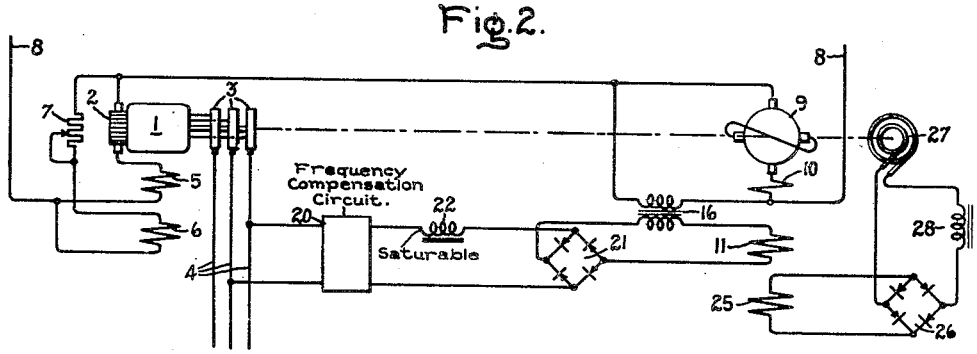
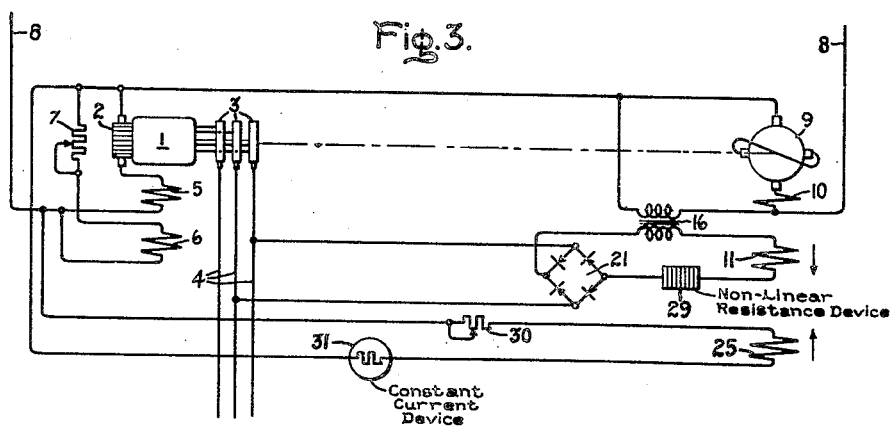
Inventor:
Alec Fisher,
by Prowell S. Mack
His Attorney.

UNITED STATES PATENT OFFICE 2,444,769

REGULATING SYSTEM FOR INVERTED ROTARY CONVERTERS

Alec Fisher, Lynn, Mass., assignor to General Electric Company, a corporation of New York Application August 17, 1946, Serial No. 691,284

11 Claims. (Cl. 171—123)

My invention relates to a regulating system for dynamo-electric machines and more particularly to a regulating system for a dynamo-electric machine for converting direct current to alternating current.

The simplest method of converting direct current to alternating current has been the use of a conventional motor-generator set in which the driving motor was supplied energy from a direct current source, and mechanically coupled to an alternating current generator producing the desired frequency and voltage. This system is satisfactory in many applications, particularly where the source of direct current energy has a relatively constant voltage and where the additional space required by the motor-generator combination is not objectionable. However, where the direct current source has a voltage variable at random between rather wide limits, the control and regulating apparatus for such a system becomes quite complex and difficult to maintain in adjustment. It is necessary to regulate the speed of the direct current driving motor to maintain the alternator speed constant so that constant frequency will be obtained, in addition to regulating the field current in the alternator to maintain constant output voltage. A variation of this system has been to employ the ordinary alternating current-to-direct current converter; however operating it inverted so that the direct current end of the machine is the input side and the alternating current end of the machine becomes the output side. This arrangement is also subject to the disadvantages of requiring considerable complex control equipment and does not lend itself to operation from a direct current source of widely varying voltage. Converting apparatus of this general type is almost a necessity for use in power supplies for railway passenger cars where the source of direct current for the car is furnished from an axle-driven generator having an output voltage that varies over a relatively wide range, or from a battery for standby operation, and where it is necessary to have available on the car a constant voltage source of alternating current. The present trend in railway car design requires considerable increased amounts of alternating current power for the operation of air-conditioning equipment, lighting and other loads which are more conveniently and economically supplied from an alternating current source. This has necessitated the use of conversion equipment of some type for transforming the variable voltage direct current source on such cars to a constant voltage alternating current system which will be automatically regulated and which will operate over long periods of time without excessive maintenance or continuous adjustment.

Accordingly, it is an object of my invention to provide an improved automatic regulating system for dynamo-electric apparatus for converting direct current to alternating current.

It is another object of my invention to provide an improved dynamo-electric apparatus for converting direct current to alternating current having quick response static regulating means for automatically maintaining the voltage and frequency of the alternating current output constant over a wide range of random variations in the direct current energy supply.

It is a further object of my invention to provide an improved automatic regulating system for a dynamo-electric apparatus that is simple, rugged and has no moving parts.

In accordance with my invention, I provide dynamo-electric apparatus of the inverted rotary converter type for transforming variable voltage direct current energy to alternating current energy at constant potential. The direct current armature of the inverted converter is connected in series with a direct current booster dynamo-electric machine which is operative to absorb excessive D.-C. energy in the case of high input direct current voltage or, conversely, to supply additional direct current energy in the case where the direct current input voltage is low. By this means a relatively constant direct current input is maintained on the D.-C. side of the inverter and consequently the alternating current output of the inverter is maintained relatively constant. For the booster dynamo-electric machine I prefer to use the armature reaction excited direct-axis compensated type of machine, known as the amplidyne, which is very satisfactory for this purpose due to the high ratio of amplification, low magnitude of control power required, and the very fast speed of response characteristic to this type of machine. In order to regulate the output of the amplidyne to provide the required boosting action, the control field of the amplidyne is energized in response to the voltage condition existing on the output or alternating current side of the inverter. The system is, therefore, regulated very closely in response to variations in voltage of the alternating current output and operates to maintain the alternating current output voltage relatively constant over a wide range of direct current input voltages which may be as great, for example, as from 96 to 160 volts.

My invention will be better understood from the following description taken in connection with the accompanying drawing, and its scope will be pointed out in the appended claims.

In the drawing, Fig. 1 represents diagrammatically a preferred embodiment of my invention for converting a variable voltage direct current source to a constant voltage alternating current output which is automatically regulated in response to variations in the alternating current voltage. Fig. 2 is a modification of Fig. 1 in which a separate pilot exciter is employed to provide a constant potential reference field for the booster amplidyne, and Fig. 3 is another modification of Fig. 1 showing a modified arrangement for controlling the excitation of the booster amplidyne in response to variations in the alternating current voltage, and eliminating the requirement for an external reference constant voltage.

Referring now to Fig. 1 of the drawing, I have shown a dynamo-electric machine 1 of the direct current-to-alternating current inverted converter type having a direct current input as represented by the commutator 2 and an alternating current three-phase output as represented by the slip rings 3 connected to the alternating current load circuit 4. The direct current input side of the machine includes a series field winding 5, and a shunt field winding 6 electrically connected across the armature and series field winding and in series with an adjustable resistance 7 for presetting the no-load speed of the inverter. The direct current side of the inverter is supplied with direct current energy from the variable voltage D.-C. source 8, and connected in series circuit relationship with the D.-C. side of the inverter 1 is the armature of the booster amplidyne 9 and its series field winding 10. The amplidyne, its operation, characteristics and advantages are fully described and claimed in Patent No. 2,227,992, granted July 7, 1941, on an application of Alexanderson and Edwards and assigned to the same assignee as the present invention.

For controlling the operation of the amplidyne 9, I have provided a single control field winding 11, the excitation of this field winding being varied in response to the A.-C. voltage existing on the load circuit 4.

In order to obtain a variable excitation for the amplidyne control field winding 11 a voltage responsive circuit is provided which functions to vary inversely the excitation of the control field 11 with changes in the alternating current voltage existing on the output circuit 4 of the inverter. Referring to Fig. 1, the voltage responsive circuit consists of a constant or reference component of excitation and a variable component of excitation, both applied to the single control field winding 11. Alternating current output voltage is taken from any pair of wires in the load circuit 4 and applied to the transformer 13 in order to provide proper potential levels for the voltage sensitive circuit, the transformer ratio depending on the rated output voltage of the inverter. The transformer also isolates the constant reference field supply circuit from the variable control field circuit. The constant or reference component is supplied from the secondary winding of the transformer 13 to the rectifier 14 through the resistor 15. The control field winding 11 and one winding of the stabilizing or anti-hunting transformer 16 are connected in series with the output terminals of the rectifier 14 and with the resistance 17 and reactor 18, thereby providing a circuit in which a substantially constant current is supplied to the control field winding 11 irrespective of voltage changes in the load circuit 4.

The nonlinear or voltage responsive component of current through the control field winding 11 is obtained by selecting a proper value of alternating current voltage by means of the tap 19 on the transformer 13 and applying this alternating current voltage to the frequency compensating circuit shown schematically at 20. Since it is desired that the circuit be sensitive and responsive to changes in voltage only on the output circuit 4, it is advisable to provide a frequency compensating network or circuit so that variations in inverter speed and output frequency will not be reflected in the control current supplied to the control field winding 11. The particular type of frequency compensating circuit employed is not important and any of the circuits of this type that are well known in the art may be employed for this circuit 20. The frequency compensated output of the network 20 is applied to the input terminals of the full wave rectifier bridge 21 through the series non-linear circuit including the saturable reactor 22, capacitor 23 and resistor 24. The rectifier is thereby supplied with an alternating current voltage that varies nonlinearly with the voltage appearing across the circuit 4 due to the non-linear characteristics of the saturable reactor 22 in combination with the capacitor 23 and resistor 24. Thus the direct current output of the rectifier 21 is caused to vary in direct relation with variations in load circuit voltage but to a greater extent due to the amplifying characteristics of the nonlinear circuit. It will be noted that the direct current output of the rectifier 21 is connected in parallel with the output of the rectifier 14 but with reverse polarity so that the result will be a differential current flowing in the control field winding 11 and stabilizing winding 16 which is the difference between the direct current outputs of the rectifiers 21 and 14. Inasmuch as the constant or reference excitation supplied by the rectifier 14 is relatively invariable, changes in the output alternating current voltage of the circuit 4 will result in inverse proportionate changes in the energization of the control field winding 11.

The stabilizing transformer 16 has one winding in series with the control field winding 11 as previously stated, and the other winding is connected in parallel with the armature of the amplidyne 9. Thus rapid fluctuations in voltage across the amplidyne armature will induce voltage changes in the control field winding circuit which are of such a direction or polarity as to counteract the original change in armature voltage, and thus function to prevent overshooting or hunting of the amplidyne and impart a desirable stabilized operating characteristic to the machine.

It should also be understood that instead of combining the constant or reference component of amplidyne field excitation and the nonlinear voltage responsive component of field excitation, as shown in Fig. 1, and applying the differential or net current to excite the control field winding 11, separate control fields could be provided for the amplidyne machine 9 wherein one field is maintained at a constant value of excitation and the other field is varied inversely with changes in alternating current load circuit voltage. However, the construction as shown in Fig. 1 renders the design and manufacture of the amplidyne simpler due to the fact that only one control field winding is necessary.

In considering the overall operation of the regulating system, when the direct current line voltage 8 is low the A. C. output voltage will be low and the voltage sensitive circuit will produce a resultant exciting flux in the amplidyne control field 11 which will be relatively high and in a boosting direction. The amplidyne will operate as a booster machine supplying additional voltage to the D. C. line voltage, thus increasing to the required value the voltage across the direct current input side of the inverter and increasing the alternating current voltage output of the inverter to the required level. Under these conditions the inverter is operating as a conventional direct current-to-alternating current inverter, transforming energy from direct current to alternating current and also running as a motor to drive the amplidyne as a booster generator so that the line voltage across the direct current side of the inverter is raised.

In the case where the direct current supply voltage is excessively high, the D. C. line current is decreased and the amplidyne assumes a motoring operation, thereby absorbing energy from the direct current system and developing a motor torque. This shaft torque drives the inverter 1 as an alternating current generator and the A. C. output thereof is a summation of conventional inverter operation plus additional alternating current energy transformed from mechanical energy supplied through the shaft from the amplidyne. Alternating current output voltage is regulated by varying the excitation of the control field 11 as previously described.

The series field 5 on the direct current side of the inverter is important in that it may be adjusted so that the inherent reactance drop of the inverter may be compensated for in order to give a slightly rising speed characteristic to the direct current side of the inverter. Taken in combination with the normal drooping speed characteristic of the alternating current output side of the inverter the increased series field excitation during increased load will tend to maintain relatively constant the speed of the inverter unit and, therefore, constant output frequency will be held on the alternating current output side of the inverter.

In Fig. 2 I have illustrated a modification of my invention which provides substantially the same operating characteristics as those of the system shown in Fig. 1, and the same reference numerals have been applied to corresponding elements of the systems appearing in both figures.

In this modification the amplidyne generator 9 is provided with two control field windings, the control field winding 11 being energized from the alternating current load circuit 4 through a nonlinear voltage sensitive network which functions similarly to that shown in Fig. 1. A second field winding 25 on the amplidyne generator 9 provides a constant or reference level of excitation for the amplidyne generator and receives its energizing direct current from the full wave rectifier bridge 26. Alternating current voltage of substantially constant potential is supplied to the input terminals of the rectifier bridge 26 from the small auxiliary pilot generator 27 which is preferably of the A. C. tachometer generator type. The generator 27 is mechanically connected to the common shaft connecting the inverter 1 and the amplidyne generator 9, so that its speed will be maintained substantially constant. In order to maintain substantially constant input voltage to the rectifier 26, a reactor 28 is placed in series with one input terminal to the rectifier, thereby maintaining as nearly a pure reactance circuit as possible so that constant energizing current will be obtained for the field winding 25.

The voltage sensitive circuit for providing the excitation of the control field winding 11 operates essentially the same as that shown and previously described in connection with Fig. 1; however, it has been shown in somewhat simplified form in the modification of Fig. 2 omitting all but the essential elements, and the nonlinear portion of the circuit, consisting of the reactor 22, capacitor 23 and resistor 24 of Fig. 1, has been replaced by a single saturable reactor which it has been found will provide the necessary nonlinearity when used with a separate reference field winding, such as shown at 25, together with its constant current energizing circuit. The operation of the system shown and described in Fig. 2 is essentially the same as that of Fig. 1 and a stabilizing transformer 16 has been included in this modification to maintain stability of the booster amplidyne 9. It will also be apparent that the constant source of energization for the control field winding 25 may be secured from any other convenient external source, such as a battery, or an available D. C. source of power in the vicinity of the installation.

Fig. 3 shows another embodiment of my invention which provides essentially the same operating characteristics as that previously described, and the same reference numerals have been applied to corresponding elements of all figures. In the modification shown in Fig. 3 a nonlinear resistance element 29 has been provided in the voltage sensitive circuit for exciting the control field winding 11 in response to voltage variations on the alternating current output circuit 4. While the circuit is not limited to the use of any particular type of nonlinear resistance characteristic material, I prefer to use the special ceramic resistance material "Thyrite" which is disclosed and claimed in Patent No. 1,822,742, granted September 8, 1931, on application of K. B. McEachron and assigned to the same assignee as this invention. This material has the property of substantially and instantaneously reducing its electrical resistance with increases of current through it or voltage across it. Inasmuch as the nonlinear negative impedance characteristic element is not sensitive to frequency variations, the frequency compensating circuit 20 may be omitted and the voltage sensitive circuit then becomes considerably simplified. The nonlinear negative impedance characteristic device 29 is placed in the output or direct current circuit of the rectifier and in series with the control field winding 11, thus the excitation of control field winding 11 will be varied nonlinearly with respect to the variations in voltage existing on the alternating current output circuit 4. An alternative method of securing the constant component of excitation for the control field winding 25 is shown in Fig. 3 where I have illustrated that the reference field 25 may be excited from the direct current input side of the inverter 1. A variable series resistor 30 is provided for making initial adjustments in the level of excitation of reference field winding 25, and a constant current device such as a ballast resistor or ballast tube 31 may be used to secure constant current flow in the reference field 25. There may be some sacrifice in the degree of regulation obtained by this means due to small voltage variations occurring across the direct current armature circuit of the inverter 1. However, for most practical purposes this arrangement will be satisfactory and eliminates the requirement for frequency compensation, and also the need for an external source of constant excitation such as the pilot generator shown in Fig. 2 or the use of a battery for this purpose. If desired the control field 11 and the constant reference field 25 of Figs. 2 and 3 may be combined in a single control field winding as shown and previously described in connection with Figure 1. The system of Fig. 3 also is provided with a stabilizing transformer 16 for maintaining stability of operation in the amplidyne generator 9.

From the foregoing it will be seen that I have provided a regulating system for dynamo-electric machines designed to produce a constant-frequency constant-voltage alternating current output from a variable voltage direct current source which is simple, free from moving parts, and entirely automatic in its operation. Output voltage is automatically maintained constant by the use of a booster dynamoelectric machine which is regulated in response to variations in the alternating current output voltage.

While I have shown and described particular embodiments of my invention, it will be obvious to those skilled in the art that changes and modifications may be made without departing from my invention in its broader aspects, and I, therefore, aim in the appended claims to cover all such changes and modifications as fall within the true spirit and scope of my invention.

What I claim as new and desire to secure by Letters Patent of the United States is:

1. Regulating apparatus for a direct current-to-alternating current energy transforming system comprising, a variable voltage source of direct current energy, a dynamo-electric machine having a direct current energy input and an alternating current energy output, an auxiliary electric generator mechanically connected to said dynamo-electric machine, said auxiliary generator output terminals and the direct current input side of said dynamo-electric machine being connected in series and across said variable voltage direct current energy source, means responsive to an electrical condition of the alternating current output side of said dynamo-electric machine for varying the output of said auxiliary generator to maintain constant said direct current voltage applied to the input of said dynamo-electric machine, said last mentioned means including a control field for said auxiliary generator, and a nonlinear saturable reactor for varying said control field excitation with changes in alternating current output voltage.

2. A regulating system for direct current energy-to-alternating current energy transformation apparatus comprising, a variable voltage source of direct current energy, a dynamo-electric machine having a direct current energy input circuit and an alternating current energy output circuit, a booster generator having a pair of control field windings, said booster generator and said direct current input terminals of said dynamo-electric machine being connected in series circuit relationship across said variable voltage direct current energy source, a constant source of excitation for one of said control field windings including a pilot exciter mechanically driven by said dynamo-electric machine and having a relatively constant voltage output, and means responsive to an electrical condition of said alternating current output circuit for varying the excitation of the other of said control field windings.

3. A regulating system for a direct current energy-to-alternating current energy transformation apparatus comprising, a variable voltage source of direct current energy, a dynamo-electric machine having a direct current energy input circuit and an alternating current energy output circuit, a booster electric generator having a pair of control field windings, electric circuit means connecting said booster generator and said direct current input terminals of said dynamo-electric machine in series circuit relationship across said variable voltage direct current energy source, an alternating current pilot exciter mechanically driven by said dynamo-electric machine and having a relatively constant voltage output, rectifying means for supplying the first of said control field windings with a constant value of direct current from said pilot exciter, means responsive to the alternating current output voltage of said dynamo-electric machine for energizing said second control field winding, said last-mentioned means including frequency compensation means for rendering said second field winding excitation means insensitive to variations in output frequency of said dynamo-electric machine.

4. A regulating system for direct current energy-to-alternating current energy transformation apparatus comprising, a variable voltage source of direct current energy, a dynamo-electric machine having a direct current energy input circuit and an alternating current energy output circuit, an auxiliary generator mechanically coupled to said dynamo-electric machine and having a pair of control field windings, circuit means connecting the output of said booster generator and the direct current input terminals of said dynamo-electric machine in series across said variable voltage direct current energy source, means for energizing one of said control field windings in accordance with the direct current potential across the input terminals of said dynamo-electric machine, and means responsive to the alternating current voltage output of said dynamo-electric machine for varying the excitation of the second of said control field windings.

5. Regulating apparatus for a direct current-to-alternating current energy transforming system comprising, a variable voltage source of direct current energy, a dynamo-electric machine having a direct current energy input circuit and an alternating current energy output circuit, an auxiliary generator mechanically connected to said dynamo-electric machine and having a control field winding, electric circuit means connecting the direct current input terminals of said dynamo-electric machine and said auxiliary generator terminals in series across said direct current energy source, a first means for energizing said control field winding with substantially constant current, a second means for energizing said control field winding nonlinearly with respect to the alternating current output voltage of said dynamo-electric machine, and frequency compensation means associated with said second control field winding excitation means for rendering said second control field winding excitation means non-responsive to variations in output frequency of said dynamo-electric machine.

6. Regulating apparatus for a direct current-to-alternating current energy transforming system comprising, a variable voltage source of direct current energy, a dynamo-electric machine having a direct current energy input circuit and an alternating current energy output circuit, an auxiliary generator having a first and a second control field winding, said auxiliary generator and said direct current input terminals of said dynamo-electric machine being connected in series circuit relationship across said variable voltage direct current energy source, means for energizing said first control field winding with a substantially constant value of current, and means for variably energizing said second control field winding nonlinearly responsive to alternating current output voltage, said last named means including a nonlinear negative impedance characteristic device.

7. Regulating apparatus for a direct current-to-alternating current energy transforming system comprising, a variable voltage source of direct current energy, a dynamo-electric machine having a direct current energy input circuit and an alternating current energy output circuit, an auxiliary generator having a first and a second control field winding, said auxiliary generator and said direct current input terminals of said dynamo-electric machine being connected in series circuit relationship across said variable voltage direct current energy source, means for energizing said first control field winding with a substantially constant value of current, and means responsive to alternating current output voltage for energizing said second control field winding, said last mentioned means including rectifying means for supplying direct current to said second control field winding and a nonlinear negative resistance characteristic element in series with said second control field winding.

8. In a system for converting direct current energy to alternating current energy, a dynamo-electric machine having a direct current input and an alternating current output, a booster generator having its output connected in series with the direct current input to said dynamo-electric machine, a variable voltage source of direct current energy for supplying said dynamo-electric machine and said booster generator, excitation means including a control field winding for said booster generator, stabilizing means for said booster generator including a transformer having one winding connected in series circuit relation with said control field winding and the other transformer winding being connected in parallel with said booster generator, and means responsive to the voltage of the alternating current output side of said dynamo-electric machine for varying said field excitation means to maintain constant said alternating current output voltage.

9. In a system for regulating to a substantially constant voltage value alternating current energy derived from a source of direct current energy normally variable at random over a wide voltage range, an integral dynamo-electric machine having direct current input terminals and alternating current output terminals, a direct current booster generator having output terminals connected in series circuit relation with said direct current input terminals and said source of direct current energy, field excitation means for said booster generator, and means responsive to the voltage of said alternating current output terminals for varying the energization of said field excitation means to maintain said alternating current voltage substantially constant.

10. In a system for regulating to a substantially constant voltage value alternating current energy derived from a source of direct current energy normally variable at random over a wide voltage range, an integral dynamo-electric machine having direct current input terminals and alternating current output terminals, a direct current booster generator mechanically connected to said dynamo-electric machine and having output terminals connected in series circuit relation with said direct current input terminals and said source of direct current energy, a field exciting winding for said booster generator, excitation means for supplying to said field winding a reference component of excitation of substantially constant value, and means non-linearly responsive to the voltage at said alternating current output terminals for supplying to said field winding a component of excitation opposing said reference component.

11. In a regulating system for a rotary inverter having its direct current input terminals connected to a source of direct current energy normally variable at random over a wide voltage range and having alternating current output terminals, a booster generator having its output terminals connected in series circuit relation with said inverter input terminals and said direct current source, a pair of control field windings for said booster generator, first excitation means for supplying to one of said control field windings a substantially constant unidirectional reference excitation current, and second excitation means non-linearly responsive to the voltage at said alternating current output terminals for supplying to said other control field winding an unidirectional excitation current differentially related to said reference excitation current.

ALEC FISHER.

REFERENCES CITED

The following references are of record in the file of this patent:

UNITED STATES PATENTS

| Number | Name | Date |
|---|---|---|
| 2,349,618 | Graybrook | May 23, 1944 |
| 2,371,030 | Crary | Mar. 6, 1945 |

FOREIGN PATENTS

| Number | Country | Date |
|---|---|---|
| 17,539 | Switzerland | 1898 |
| 276,467 | Great Britain | Sept. 1, 1927 |